United States Patent

Hartman et al.

[11] Patent Number: 6,111,030
[45] Date of Patent: Aug. 29, 2000

[54] EPOXY, POLYSULFIDE AND CYANOACRYLATE COMPOSITES UTILIZING ACTIVATABLE AMINO-POLYAMIDE CURATIVES

[75] Inventors: Terrence L. Hartman, Franklin Park; Charles A. Cody, Robbinsville, both of N.J.

[73] Assignee: Rheox, Inc., Hightstown, N.J.

[21] Appl. No.: 08/184,526

[22] Filed: Jan. 21, 1994

[51] Int. Cl.[7] .................................................. C08F 283/04
[52] U.S. Cl. ........................ 525/420; 525/423; 525/426; 525/533; 525/537; 528/345
[58] Field of Search ................... 525/420, 423, 525/426, 533, 537; 528/345

[56] References Cited

U.S. PATENT DOCUMENTS 3,261,882  7/1966  Gorton ................................. 260/830
3,639,657  2/1972  Moran et al. ........................ 260/47 EP
3,759,914  9/1973  Simms et al. ........................ 260/37 EP
4,126,505  11/1978  Garnish et al. ....................... 260/830

FOREIGN PATENT DOCUMENTS 3246267  of 0000  Germany .

*Primary Examiner*—Helen L. Pezzuto
*Attorney, Agent, or Firm*—Michael J. Cronin

[57] ABSTRACT

The present invention relates to cured compositions useful as adhesives and sealants formed by dispersing an amine-terminated polyamide curative into a base to form a composite and activating the composite forming the cured composition. Bases described include epoxies, polysulfides and cyanoacrylates. Curing mechanisms include heat and pressure activation. The amine-terminated polyamide curative has a ratio of equivalents of amine to acid groups of from about 1.05:1.00 equivalents $NH_x$:COOH to no greater than about 1.95:1.00 when x is 1 or 2.

10 Claims, No Drawings

EPOXY, POLYSULFIDE AND CYANOACRYLATE COMPOSITES UTILIZING ACTIVATABLE AMINO-POLYAMIDE CURATIVES

FIELD OF THE INVENTION

The present invention relates to latent curable composites which can be cured by activation from external stimuli. The invention is directed to producing curable epoxy and other base composites using defined amino-polyamide curing agents. In the present invention, epoxy, polysulfide, and cyanoacrylate composites are cured by heat and other mechanisms to provide, after such curing, compositions useful as adhesives, sealants, coatings, molded articles and other similiar commercial products.

BACKGROUND OF THE INVENTION

Manufacturers and users of curable formulated products such as adhesives, sealants, coatings and molded articles have an ongoing interest in products that cure faster and with less energy input in addition to their interest in simplifying formulating and storage as well as easing handling. Several types of curable systems have been found by applicants to experience advantages when cured by certain types of amino-polyamides. Particular systems where these new curatives have been found to be especially useful include epoxies, polysulfides and cyanoacrylates.

U.S. Pat. No. 5,231,147, issued to applicants on Jul. 27, 1993, discloses a one-component polyurethane adhesive system useful for bonding together products used in the construction of various materials. This patent describes dispersing a polyamide resin into a polyurethane to form a composite, and then activating the composite by heating to form, by curing, an adhesive composition. The polyurethane base and the polyamide curing agent are mixed together and remain stable prior to activation.

Epoxy, polysulfide and cyanoacrylate chemistry is currently utilized in producing numerous types of adhesive, sealant and other products.

I. Epoxy resins are organic materials (including oligomers or polymers) that contain at least two epoxide functional groups. A respresentative epoxy formula follows:

$R_1$ may be any alkyl, aryl or other moiety in various combinations. Epoxies have been cured with liquid amines, liquid amine-functional polyamides or solid or liquid latent curatives, usually of an amine type. In most systems, the liquid amine or polyamide curative is used as a second component from the epoxy base since reaction begins upon mixing. There exists a general inability by most manufacturing companies to formulate single component products with these curatives. In addition, sustained oven post-curing may also be required.

Types of epoxy resins include:

a) Polyglycidyl and poly(β-methylglycidyl) esters which can be obtained by reacting compounds containing two or more carboxyl groups with epichlorohydrin, glycerol dichlorohydrin or β-methylepichlorohydrin in the presence of alkaline substances.

Examples of compounds with at least two carboxyl groups include aliphatic polycarboxylic acids, cycloaliphatic polycarboxylic acids and aromatic polycarboxylic acids. Particular examples of tricarboxylic and higher carboxylic acids are: aromatic tricarboxylic or tetracarboxylic acids, such as trimellitic acid, trimesic acid, pyromellitic acid or benzophenonetetracarboxylic acid, dimerized or trimerized fatty acids, and copolymers of (meth)acrylic acid with copolymerizable vinyl monomers, for example the 1:1 copolymers of methacrylic acid with sytrene or with methyl methacrylate.

b) Polyglycidyl and poly(β-methylglycidyl) ethers which can be obtained by reacting a compound containing two or more alcoholic hydroxyl groups and/or phenolic hydroxyl groups with epichlorohydrin, glycerol dichlorohydrin or β-methylepichlorohydrin under alkaline conditions, or if in the presence of an acid catalyst, the treating of the resultant product with alkali.

Examples of compounds with two or more alcoholic hydroxyl groups and/or phenolic hydroxyl groups are aliphatic or cycloaliphatic alcohols, and alcohols containing aromatic groups, such as N,N-bis(2-hydroxyethyl) aniline or p,p'-bis(2-hydroxyethylamino)diphenylmethane, or mononuclear or polynuclear phenols, such as resorcinol, hydroquinone, bis(4-hydroxyphenyl)methane, 2,2-bis(4-hydroxyphenyl) propane, brominated 2,2-bis(4-hydroxyphenyl)propane, bis(4-hydroxyphenyl)ether, bis(4-hydroxyphenyl)sulfone, 1,1,2,2-tetrakis(4-hydroxyphenyl) ethane or novolacs which can be obtained by condensing aldehydes, such as formaldehyde, acetaldehyde, chloral or furfuraldehyde, with unsubstituted, alkyl-substituted or halogen-substituted phenols.

c) Poly(S-glycidyl) compounds, including di-S-glycidyl derivatives which are derived from dithiols, such as ethane-1,2-dithiol, or from bis(4-mercaptomethylphenyl) ether.

d) Poly(N-glycidyl) compounds which can be prepared by dehydrochlorinating reaction products of epichlorohydrin with amines which contain at least two amino hydrogen atoms.

Examples of amines on which such epoxy resins are based are aliphatic or cycloaliphatic amines, aromatic amines, such as aniline, p-toluidine, bis(4-aminophenyl)methane, bis(4-aminophenyl)sulfone or bis(4-aminophenyl) ether, or araliphatic amines, such as m-xylylenediamine.

The poly(N-glycidyl) compounds also can include triglycidyl isocyanurate, N,N'-diglycidyl derivatives of cycloalkyleneureas such as ethyleneurea or 1,3-propyleneurea, and N,N'-diglycidyl derivatives of hydantoins such as 5,5-dimethylhydantoin.

e) Cycloaliphatic epoxy resins or epoxidation products of dienes or polyenes, such as cycloaliphatic epoxy resins which are prepared in preferred embodiments by epoxidizing ethylenically unsaturated cycloaliphatic compounds. Examples are, 2,3-epoxycyclopentyl glycidyl ether, 1,2-bis (2,3-epoxycylopentoxy)ethane, diglycidyl cyclohexane-1,2-dicarboxylate, 3,4-epoxycyclohexyl glycidyl ether, bis(3,4-epoxycyclopentyl)ether, bis(2,3-epoxycyclopentyl)ether, dicyclopentadiene dioxide and 3,4-epoxycyclohexylmethyl-3',4'-epoxycyclohexanecarboxylate.

It is also possible to cure epoxy resins in which the 1,2-epoxy groups are bonded to different heteroatoms or functional groups; for example, the N,N,O-triglycidyl derivative of 4-aminophenol, the glycidyl ether glycidyl ester of salicylic acid, and 2-glycidyloxy-1,3-bis(5,5-dimethyl-1-glycidylhydantoin-3-yl)propane.

Various prior art epoxy systems have used amine or amine-type curatives. The vast majority of such systems are two-part systems which cure immediately when two different components are mixed. See, for example, U.S. Pat. Nos. 5,001,193, 4,914,164, 4,751,278, 4,484,004, 4,460,790, 4,322,321, 4,277,621 and 4,150,229. Similarly, polysulfide systems using amine and nitrogen curatives are known. See, for example, U.S. Pat. Nos. 4,542,183 and 4,067,842. Cyanoacrylate non-latent systems using amino catalysts or amine materials exist. See U.S. Pat. Nos. 4,702,783 and 3,940,362.

U.S. Pat. No. 4,322,321 describes one or more curing systems for epoxy resins utilizing a polyamide as a curative but the curative reacts readily. U.S. Pat. No. 3,755,261 shows the curing of amine-curable polymers with salts of aromatic diamines. U.S. Pat. No. 4,914,164 discloses processes using polyamidoamines as curatives for epoxy resins involving very long cure times.

It would be highly desirable to develop a epoxy curing system utilizing amino-terminated polyamides which would be stable and latent until the introduction of external activation to initiate cure.

Many known one-component, heat-curable adhesive compositions require sustained heating, and possibly fixturing, to cure. Therefore, heat sensitive substrates generally cannot be used with such heat-curable adhesives.

U.S. Pat. No. 5,073,601 involves the use of a polyamide as a backbone component in a epoxy system requiring long heat time. U.S. Pat. No. 4,506,099 describes specific liquid diamines used as curing agents for epoxy resins.

The need for latent epoxy adhesive curatives involving polyamine or amine-epoxy adducts and a proposed solution is described in an article appearing on pages 17 to 20 of *Adhesives Age* for June, 1992. Finely-divided, amine-type solid hardeners dispersed in liquid epoxy, likely as solid latent polyamides of a cyclic tetra-amide type, are discussed in an article appearing on pages 186 to 192 of the October, 1985 issue of *Modern Paint and Coatings*.

Two recent U.S. patents issued to Ciba Geigy Corporation are of particular interest. U.S. Pat. No. 5,138,078 describes a curing agent for a thermosetting coating and casting composition which is selected from the group consisting of dicyandiamide, the carboxylic acid functional thermosetting polyesters, the phenolic terminated polyhydroxyethers, the amines and the anhydrides.

German Patent Application DE 3246267 A1 published on Jun. 30, 1983 discloses latent epoxy curing agents utilizing amino-diamide curing compositions. The patent describes a synthesis process involving purification and/or extraction steps for eliminating highly reactive mono-amides from the curatives disclosed and discloses curing times of at least from ten to sixty minutes at temperatures of 100–150° C.

II. Polysulfides are prepolymers that contain at least two mercaptan functional groups. A representative polysulfide formula follows:

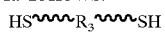

$R_3$ may be any alkyl, aryl or other moiety in various combinations. Polysulfides are generally cured by certain metal peroxides or dichromates. If formulation of single-component systems is desired, less reactive peroxides such as calcium peroxide or zinc peroxide have been selected. These curatives become activated in the presence of relatively alkaline materials such as atmospheric moisture. These single component formulations cure very slowly, and depend on diffusion of the activating material through the curable mass. Such prior art systems generally cure on their outer surfaces initially; then, very gradually, the curing progresses toward the inner regions. Two-component systems have generally been used by manufacturers in actual practice to produce commercial products.

Certain polysulfide compositions can be cured in the presence of moisture. For instance, U.S. Pat. No. 3,659,896 describes an automobile windshield mounting and sealing means that is provided by a preformed, adhesive, curable sealing strip comprising a thiol terminated synthetic polymer, particularly a liquid polysulfide polymer. The polymer cures in the presence of atmospheric moisture under ambient room temperature and weather conditions.

A curable polysulfide base shown in the art can also be a prepolymer having a plurality of mercaptan functionality that can be cured by certain peroxides in the presence of relatively alkaline materials such as atmospheric water. Such prepolymers may be prepared by techniques as described in the Kirk-Othmer Encyclopedia of Chemical Technology, Third Edition, Volume 18, p. 825. The prepolymers have an average molecular weight of from about 300 to about 8,000. Typical polysulfide prepolymers may be obtained from Morton Thiokol, Inc., Chicago, Ill. and are described in their brochure "LP Liquid Polysulfide Polymer". Additional illustrative polysulfide systems are described in U.S. Pat. Nos. 3,659,896 and 3,714,132, the contents of all of this information being incorporated by reference.

While calcium peroxide and zinc peroxide are preferred, additional compounds which can be used are lead peroxide, cadmium peroxide, magnesium peroxide, ammonium dichromate, potassium dichromate, sodium dichromate and others. The amount of peroxide or dichromate included in the composition is from about 2 to about 35 parts by weight, based upon 100 parts by weight of polysulfide prepolymer.

III. A still further type of system curable using the compounds of this invention as described hereafter is the polymerization of alpha-cyanoacrylic acid esters (also known as 2-cyanoacrylic esters) which polymerize in the presence of basic materials such as water. A representative formula for such esters follows:

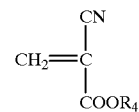

$R_4$ may be any alkyl, aryl or other moiety in various combinations, particularly an alkyl group containing from 1 to 4 carbon atoms.

Preferred alpha-cyanoacrylic acid ester systems use methyl-2-cyanoacrylate, ethyl-2-cyanoacrylate, propyl-2-cyanoacrylate, isopropyl-2-cyanoacrylate, butyl-2-cyanoacrylate and isobutyl-2-cyanoacrylate. Such esters are commercially available from Eastman Kodak Co., Loctite Corp., Schering Industrial Chemicals, and Henkel Corporation among others. Additional information concerning cyanoacrylic ester polymers may be found in the Kirk-Othmer Encyclopedia of Chemical Technology, Third Edition, Vol. I, p. 408–413, the contents of which are incorporated by reference.

OBJECT OF THE INVENTION

The present invention overcomes the problems and disadvantages of the prior art by providing a process for producing epoxy and other compositions cured by amine functionalities. and polysulfide and cyanoacrylate and other compositions cured in the presence of alkaline substances, wherein a latent, in-situ activated curing mechanism is employed.

Two-component systems require complicated metering and mixing equipment, and heated or other types of fixtures, in order to assure the substantial curing will take place throughout their entire structure. The final properties of the compositions produced by such systems depend on the accuracy of the mix ratio and the efficiency of the mixing apparatus used. It is therefore an object of the invention to provide one component thermosetting compositions that cure quickly throughout their entire structure utilizing unique amino-polyamide curing agents.

It is moreover one object of the present invention to provide a curable composite for epoxy, polysulfide and other systems that is relatively stable until activated.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

SUMMARY OF THE INVENTION

The present invention addresses the problems and disadvantages of the prior art by providing an improved latent curable composite to produce epoxy, polysulfide and cyanoacrylate compositions.

To achieve the objects and in accordance with the purpose of the invention, the invention in a preferred embodiment provides a process for producing a thermosetting composition comprising dispersing an amine-terminated solid polyamide resin into a curable base system to form a nonactivated composite. The process further comprises later heating the same to cure the composite and form the composition which can be an adhesive, sealant, coating or molded article.

The invention also provides a process for producing a curable adhesive comprising dispersing an amine-terminated solid polyamide resin into a epoxy base to form a nonactivated composite, and activating the composite by heat or pressure to cure the composite and form the adhesive composition.

Applicants' use of the terms "curing" and "thermosetting" is to define the irreversible quality of the process whereby the system is chemically reacted, so that its original component materials cannot be reformed or recovered by reversing the process. The mechanism to obtain this quality can be the application of heat, but in applicants' definition would also include curing activation mechanisms such as pressure, mechanical mixing, sonic treatment, or the application of microwave energy for example.

The invention also encompasses improving the stability of the amine-terminated polyamide comprising either surface treating the amine-terminated polyamide or encapsulating said polyamide with an inert material prior to dispersing it into the epoxy or other type system.

The processes of the invention provide one-component, latent and activatable composites useful in structural bonding applications in the automotive, aerospace, electronics, marine and furniture assembly industries, for example. The adhesive compositions of the invention are fast-curing, exhibit superior green strength, superior structural adhesive properties, and superior heat resistance than prior art adhesive compositions. The compositions when formed adhere to a wide variety of substrates, and thus are useful in numerous applications.

The composites of the present invention may also contain a variety of conventional additives. For instance, the composites can contain catalysts, solvents, titanium dioxide or other pigments or opacifiers, plasticizers, stabilizers, dyes, fillers, organoclay or other thixotropes, reinforcing agents, antioxidants, lubricants, defoaming agents, anticorrosives, antiskinning agents, adhesion promoters, and flame retardants, in amounts and using techniques well known to those of ordinary skill in the art.

The curing agents as well as the composites described of the instant invention can also contain additional curing and other components, if necessary, and in combination, accelerators if suitably encapsulated or rendered non-activated.

The composites of the present invention may be used in a wide variety of applications beyond adhesives. More specifically, the composites can be used to form molding materials, coatings, sealants or caulks.

As it is desired to inhibit reaction between components of the composite until activation, particles of the amino-polyamide curing agent or one or more components thereof, which are dispersed throughout the composite, can be provided with a coating that protects the curing agent from direct contact with the base before activation, but allows for the exposure of the curing agent by activation. For instance, if the coating of the curing agent is chosen to be pressure sensitive, and the epoxy based composite is subjected to pressure in order to activate curing, the coating would be selected so that the activating pressure would degrade the coating thereby permitting reaction of the curing agent and the epoxy base to form a thermoset composition.

DESCRIPTION OF THE PREFERRED EMBODIMENTS

Reference will now be made in detail to the present preferred embodiments of the invention. The most important process direction is that the curative be intimately mixed with the base system.

In one example where a liquid epoxy system is used, an amine-terminated solid polyamide is dispersed into an epoxy system at a temperature of from about room temperature to about 100° C. to form a composite. The composite is preferably heated to a temperature of from about 70° C. to about 220° C. to activate the polyamide resin to perform as an in-situ curing agent to cure the epoxy composite and form a thermoset composition. The epoxy systems useful in the above process are those materials that have melting points at least about five degrees lower than the melting point of the amine-terminated solid polyamide curative employed. Note however that the base system of the invention may be solid, powder, or molten and is not intended to be limited to a liquid form. For example, a finely ground curative powder may be thoroughly mixed with a powdered epoxy.

The amino-polyamide curative can be prepared by reacting an excess of a polyamine compound with a polycarboxylic acid. The compound may be one or more of an aliphatic, cycloaliphatic or aromatic diamine compound having from about 2 to about 40 carbon atoms. Alkylene diamine compounds are most preferred. Exemplary suitable diamine compounds include ethylene diamine, 1,2-diaminopropane, 1,3-diaminopropane, 1,4-diaminobutane, p-xylene diamine, 1,6-hexamethylene diamine, 2-methypentamethylene diamine, 4,4'-methylene bis (cyclohexylamine), 2,2-di-(4-cyclohexylamine), 2,2-di(4-cyclohexylamine) propane, polyglycol diamines, isophorone diamine, m-xylene diamine, cyclohexane bis (methylamine), bis-1,4-(2'-aminoethyl)benzene, 9-aminomethylstearylamine, 10-aminoethylstearylamine, 1,3-di-4-piperidyl propane, 1,10-diaminodecane, 1,12-diaminododecane, 1,18-diaminooctadecane, piperazine, N-aminoethylpiperazine, bis-(3-aminopropyl)piperazine, polyethylene polyamines such as diethylene triamine and triethylene tetramine, diethyltoluene diamine, methylene dianiline and bis(aminoethyl)diphenyl oxide. Dimeric fatty diamines and "ether diamines" may also be used.

Monoamines are also suitable for use in the invention. Exemplary suitable amines include methylamine, dimethylamine, ethylamine, diethylamine, n-propylamine, di-n-propylamine, isopropylamine, n-butylamine, isobutylamine, sec-butylamine, tert-butylamine, di-n-butylamine, monoamylamine, diamylamine, ethylbutylamine, n-hexylamine, di-n-hexylamine, cyclohexylamine, benzylamine, α-phenylethylamine, β-phenylethylamine, aniline, methylaniline, diphenylamine, o-toluidine, m-toluidine, p-toluidine, o-anisidine, m-anisidine, p-anisidine, dodecylamine, cocoamine, hexadecylamine, octadecylamine, oleylamine, dicocoamine, and di(hydrogenated-tallow)amine; amides such as cocoamide, octadecanamide, oleamide, o-toluene sulfonamide and p-toluene sulfonamide; and polyetheramines such as polyoxyethylene amine(s) and polyoxypropylene amines (s).

Polycarboxylic acids having a functionality of two are preferred for making an amine-terminated solid polyamide resin for use in the process of the invention. Dimerized fatty acids are suitable; however, straight-chain, lower molecular weight diacids such as sebacic acid, azelaic acid and dodecanedioic acid are preferred in preparing the polyamide resin. The term "dimerized fatty acid" is intended to include any acid obtained by dimerizing saturated, ethylenically unsaturated or acetylenically unsaturated naturally occurring or synthetic monobasic aliphatic carboxylic acids containing from 8 to 24 carbon atoms. Such dimerized fatty acids consist essentially of a mixture of about 36 carbon atom dicarboxylic acids, and usually also contain several isomeric dimers together with a small amount of trimer and higher polymers, and are fully described in U.S. Pat. No. 4,018,733, the disclosure of which is incorporated herein by reference. Other suitable dicarboxylic acids include those that contain 2 to 20 carbon atoms, such as oxalic, glutaric, malonic, adipic, succinic, suberic, sebacic, azelaic, dodecanedioic, pimelic, terephthalic, isophthalic, phthalic, napthalene dicarboxylic acids and 1,4- or 1,3-cyclohexane dicarboxylic acids.

In general, any dicarboxylic acid in which the carboxylic acid groups are separated by a bivalent hydrocarbon group which may be saturated or unsaturated, aliphatic, aromatic or cycloaliphatic, or which may have two or more aliphatic, aromatic or cycloaliphatic moieties, can be used to form the polyamides. Also, any polycarboxylic acid in which the average functionality (number of functional groups per molecule) is greater than two may be used. Corresponding acid anhydrides, esters, and acid chlorides of the foregoing acids are also suitable for use in the present invention and are encompassed by the term "dicarboxylic acid."

Monocarboxylic acids are also suitable for use in the invention. Exemplary suitable monocarboxylic acids include fatty acids. The term "fatty acids" as used herein is intended to include saturated, ethylenically unsaturated and acetylenically unsaturated naturally occurring and synthetic monobasic aliphatic acids containing from 8 to 24 carbon atoms. Suitable saturated fatty acids include branched and straight chain acids. Suitable ethylenically unsaturated acids include the branched or straight chain poly- and mono-ethylenically unsaturated acids. Any acetylenically unsaturated fatty acid, both straight and branched chain, both mono-unsaturated and poly-unsaturated, are useful herein.

Conventional processes for preparing polyamides may be employed. The reactants are blended and heated gradually to from about 180° C. to about 240° C. During temperature elevation, a condenser and collection vessel may be attached to collect the condensed water and any volatilized amine.

Catalysts may also be employed to accelerate and improve the efficiency of the polyamide reaction. Suitable catalysts include acid compounds such as phosphoric acid, oxides or carbonates of alkaline nature such as magnesium oxide or calcium oxide and halogen salts of polyvalent metals and acids. The catalyst is generally present in an amount of from about 0% to about 3% by weight of the polyamide being synthesized.

The ratio of equivalents of amine to acid groups (i.e., $NH_x$:COOH groups (where x is 1 or 2)) for the amino-polyamide synthesis to produce the improved curative of the described invention is particularly critical in obtaining the beneficial effects in epoxy, polysulfide and cyanoacrylate systems of the curing composition of our invention. The ratio must be from about 1.05:1.00 equivalents $NH_x$:COOH to no greater than about 1.95:1.00 equivalents $NH_x$:COOH. A ratio of about 1.20:1.00 to about 1.80:1.00 is preferred. Care must be taken to assure that the product obtained meets these specifications as higher ratios are particularly to be avoided. Ratios higher than 1.95:1 are generally avoided since they result in products of a lower molecular weight. The mobility of a chemical moiety to successfully diffuse into another body is proportional to the square root of the chemical's weight, all other factors being equal. Therefore, low molecular weight products are much more mobile in the base leading to inferior stability and diminished shelf life. Any ratio greater than 2.00:1 also will result in free unreacted amine moieties, which are particularly unwanted in a latent epoxy composite as they are immediately reactive with the base used.

An amine excess, over that which is desired for reaction with the carboxylic acids present, is typically employed in a polyamide synthesis. In some processes the initial input ratio of amine equivalents to acid equivalents may be greater than or equal to about 2:1. The main process reason for employing such an excess is that, under certain conditions of handling and synthesis, some of the amine is lost due to volatilization. Once the majority of acid functional groups are neutralized by amine molecules that participate in the reaction however, any nonreacted non-volatilized excess of free amine is removed. The resulting ratio of amine equivalents to acid equivalents participating in the reaction and representing the final product should then be $\leq 1.95:1$ to accomplish the beneficial effects of the instant invention with no appreciable free amine moieties being present.

When the appearance, viscosity, acid value and amine value have stabilized, a vacuum, preferably greater than 29 in. Hg, is applied to degas the polymer and remove trace amounts of water and unreacted amine, if present. The cooled solid product can then be milled to a fine powder for example.

The amine-terminated solid polyamide curative can then in one embodiment be dispersed in an epoxy base to form a stable dispersion of a nonactivated composite. The composite is then activated by heating to a higher temperature, the temperature being above the softening point of the amine-terminated polyamide curative. By such heating, the amine groups are exposed, becoming reactive with the epoxy base, whereby the composite cures to form a thermoset composition.

An additional embodiment of the present invention relates to a process for making the surface of the amino-polyamide curative non-reactive, and improving the stability of the composite comprising treating the polyamide resin by encapsulating the amino-polyamide curative in an inert material prior to dispersing the same in the base.

Applicants have found that encapsulation of the amine-terminated polyamide resin in an inert material provides improved stability, for example shelf life and pot life, of the nonactivated composite. Encapsulation isolates the polyamide curative from the reactive groups of the base system and thus prevents premature formation of the final composition.

A variety of techniques can be used to activate the curing agent and the specific technique sometimes depends on the intended function of the final composition. One manner of activating the curing agent is by the application of heat which can be directly applied by placing the composite in an oven or by applying a source of heat thereto, such as by using a hot air blower, or by bringing the composite into physical contact with a hot surface, or by subjecting the composite to microwave energy, induction heating, ultraviolet radiation, infrared radiation or mechanical mixing depending on the curing agent selected. The activation of the curing agent substantially must not adversely affect the curable base. For example, if activation of the curing agent occurs at a temperature that causes significant degradation of the curable base, then a different curing agent should be selected or a different means of activation should be used. In this latter regard, if the curing agent can be heated (e.g., by microwave energy) without causing significant degradation of the curable base, then a suitable curable composite can be prepared.

Curing can be activated by short bursts of laser light, other energy sources such as electricity, by pressure, or by other vehicles. The selection of particular amino-polyamide curative agents sensitive to the different methods of activation is within the ordinary talent of a skilled artisan.

The described amino-polyamide curatives are unlike any commercial products available at this time. In a preferred embodiment they can be free-flowing powders, and are optionally surface-treated for enhanced stability in the end use system prior to activation.

The inventive amino-polyamides are dispersed in the epoxy, polysulfide or cyanoacrylate base systems during compound formulation. In a preferred embodiment, they activate upon melting of the solid curative particles, typically at a temperature at or above the ring and ball softening point of the solid amino-polyamide curing agent. Such physical activation does not require long-term heating. As the particles melt, the fluidized curative begins homogeneously reacting in situ with the base system, as all of its previously shielded amine groups have become available for reaction.

Without being limited to a particular reaction theory, applicants believe the curing mechanism shown below, to be effective, will vary according to the type of system to be cured.

When incorporating a representative solid amino-polyamide curative into an epoxy system, products can be formulated that are either single or multi-component. The system can preferably be cured rapidly, with post-curing or sustained oven curing not being required. This curing likely occurs via the following reaction:

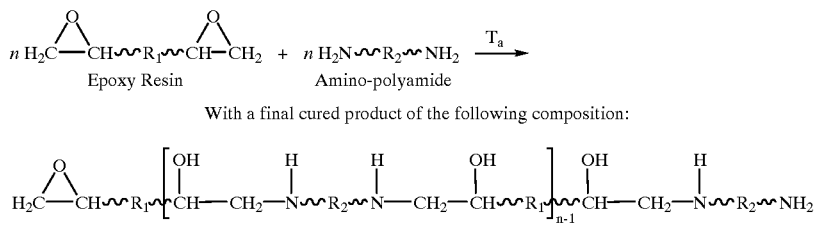

Epoxy Resin    Amino-polyamide

With a final cured product of the following composition:

$R_2$ may be any structure with a regularity of amide groups present, for example, an aliphatic polyamide. Ta is the minimum activation temperature. In general, Ta should be approximately equal to the ring and ball softening point of the curative. The duration (i.e., dwell time) at this temperature may be as short as one to five seconds, or may be longer (e.g., a few minutes). Higher temperatures may also be used as long as they do not degrade the composite or composition.

When incorporating a solid amino-polyamide curative into a single-component polysulfide or cyanoacrylate systems, products can also be formulated that cure rapidly and evenly. In general, the same conditions of activation apply as were discussed in connection with epoxies. Polysulfide curing likely occurs via the following reaction:

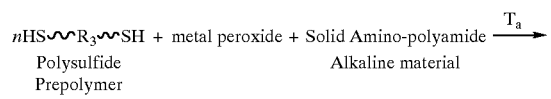

Polysulfide           Alkaline material
Prepolymer

With a final cured product of the following composition:

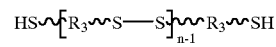

Cyanoacrylates are monomers (2-cyanoacrylic esters) which polymerize according to the following likely reaction sequence.

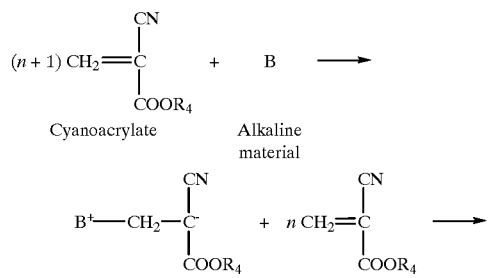

With a final cured product of the following composition:

-continued

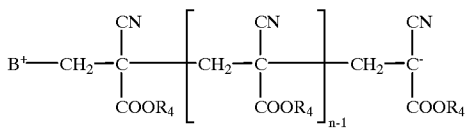

When the system contains a curative of the invention, representing the alkaline material in the reaction sequence above, the mixture will behave similarly to polysulfide systems with substantially accelerated reaction and curing time.

Curing of other systems is also be possible, providing that the systems react with or are accelerated by amine-containing materials. Furthermore, by employing the amino-polyamide curatives of the present invention, curing can be accelerated and also controlled so that activation will only take place upon short term exposure to heat or other activating mechanism. These composites possess good stability provided the composites are not exposed to temperatures at or exceeding $T_a$ for any appreciable period of time.

The following Examples are provided to illustrate our invention. Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLE 1

Preparation of Amino-polyamide Curative #1

Into a one liter resin reaction flask, 426.0 g of Dytek A (2-methylpentamethylenediamine from DuPont) were charged. While mixing, two drops of phosphoric acid (85%) and 374.0 g of sebacic acid, CP Grade (Union Camp), were added. A dual condenser system was employed to reflux reactants and collect both water of condensation as well as excess amine that remained unreacted. The reactants were mixed and heated gradually to the range of 220 to 240° C., then maintained at this temperature for approximately 16 hours, the final two hours of which a vacuum of about 30 in. Hg was applied to degas the polyamide resin and remove unreacted excess amine and trace amounts of water. The molten resin was discharged into a release paper-lined box and cooled under nitrogen in a desiccator.

EXAMPLE 2

Preparation of Amino-polyamide Curative #2

Using a four liter apparatus similar to Example 1, 512.8 g of diethylenetriamine (Dow) and 1157.2 g of anhydrous hexamethylenediamine (DuPont) were charged, the latter of which had been preheated to 70° C. to render it fluid. While mixing, eight drops of phosphoric acid (85%) and 1530.0 g of Corfree M2 (dodecanedioic acid from DuPont) were added. The reactants were mixed and heated gradually to the range of 220 to 240° C., then maintained at this temperature for approximately 33 hours including approximately eight hours of periodic application of a vacuum of about 30 in. Hg to degas the polyamide and remove unreacted excess amine and trace amounts of water. The molten resin was discharged into four release paper-lined boxes and cooled under nitrogen in desiccators.

TABLE 1

Test Results of Solid Amino-polyamide Curatives

| Amino-polyamide Curative | #1 | #2 |
|---|---|---|
| Amine Value (mg KOH/g) | 125.1 | 164.5 |
| Acid Value (mg KOH/gL) | 0 | 0.2 |
| Shore D Hardness | 59 | 68 |
| Ring and Ball Softening Point (° C.) | 120 | 164 |
| Brookfield Thermosel Viscosity(cP) | | |
| At 200° C. | 64 | 218 |
| At 160° C. | 165 | 605 |
| At 120° C. | 933 | — |

A stoichiometric excess of amine was employed due to amine volatility during polyamide synthesis. In these test examples (1 and 2), the following quantities were employed:

| Example | 1 | 2 |
|---|---|---|
| Amine Equivalents | 2.0 | 2.625 |
| Acid Equivalents | 1.0 | 1.000 |
| Theoretical Final Amine Value (mg KOH/g) | 280.2 | 408.9 |

If the entire quantities of amine had participated in the synthesis, the final products amine values would be as indicated above. The actual, titrated, final amine values were considerably lower. While setting the number of acid equivalents at 1.0, the actual number of amine equivalents participating in the reaction were calculated. The resulting ratios of equivalents, $NH_x$:COOH, for the two curatives of Examples 1 and 2 were:

| Amino-polyamide Curative | #1 | #2 |
|---|---|---|
| $NH_x$:COOH | 1.45:1 | 1.66:1 |

Once completely cooled and solidified, the two curatives were broken into medium sized chips and milled to a powder (with the aid of liquid nitrogen chilling) using a Brinkmann centrifugal mill. The milled polyamides were then passed through a 60 mesh screen to remove coarse particles.

The powdered ($\leq 250$ micron) curatives were then surface-treated by the following method:

Two parts by weight of p-toluene sulfonyl isocyanate (pTSI) were combined with 148 parts by weight of toluene in a mixing vessel under a dry nitrogen purge. To this solution, 100 parts by weight of the powdered, dried curative were added. The contents were slurried under a dry nitrogen purge for 15 minutes during which the pTSI was allowed to react with amine groups on the surface of the curative particles.

The majority of toluene was then removed from the mixture by vacuum-filtration using a Buchner funnel. The filter cake was dried to constant weight at 70° C. under vacuum. The curatives differed in amine equivalent weight, functionality and melting point. See the chart below:

| Curative# | EW(g/eq) | Functionality | MP (° C.) |
|---|---|---|---|
| 1 | 462.5 | 2 | 120 |
| 2 | 374.5 | ≥3 | 161 |

EXAMPLE 3

Preparation and Testing of Three Epoxy Formulas

Three epoxy composites were prepared as indicated in Table 2 by combining the following ingredients utilizing the curatives from Examples 1 and 2:

TABLE 2

EPOXY FORMULA COMPOSITIONS (% BY WT.)

|  | A | B | C |
|---|---|---|---|
| Araldite GY508 (epoxy resin from Ciba-Geigy) | 41.99 | 45.95 | 76.92 |
| Ketjenflex 8 (sulfonamide plasticizer from Akzo) | 12.59* | 13.79* | 23.08* |
| Curative #1 | 45.42 | — | — |
| Curative #2 | — | 40.26 | — |
|  | 100.00 | 100.00 | 100.00 |

*30 parts per hundred of epoxy resin.

The curative loading level used in each formula was calculated to provide a 1:1 amine to epoxide ratio. Secondary amines resulting after reaction between primary amines and epoxides were not included. Formula C was the control in this experiment and it contained no curative. Two 10 g samples were taken from formulas A, B and C and placed into aluminum weighing dishes. One sample of each formula was exposed to ambient conditions while the other sample was subjected to a 10 minute heating at 125° C. in an oven. After the completion of the cure in the oven the sample was allowed to cool to room temperature and observations were made. A comparison of the 125° C. heated samples to the ambient exposed samples was carried out. Test results are illustrated in Table 3.

The ambient exposed samples remained unchanged from the original date of preparation. To be noted is that all of the ambient exposed samples were fluid and had not cured.

TABLE 3

CURE OBSERVATIONS OF EPOXY FORMULAS

| Formula | A | B | C |
|---|---|---|---|
| Ambient exposed | Very viscous, fluid | Viscous, fluid | Readily pourable, fluid |
| Oven exposed (10 g, 10 min. at 125° C.) |  |  |  |
| Appearance | Solid | Solid | Fluid |
| Shore A Hardness | 34 | 69 | Not testable |

The samples exposed to 125° C. heating showed definite changes. The samples of Formulas A and B which contained the inventive curatives became solid after 10 minutes at 125° C. The sample of Formula C which contained no curative remained fluid and appeared the same as the ambient exposed sample.

In summary, both of the two curatives performed well as curatives in a one-part epoxy system. This was demonstrated by the fact that when samples of Formulas A and B were heated to 125 ° C. they solidified while the samples of Formulas A and B that were left at room temperature remained fluid. This demonstrated that the curatives were non-reactive until they were activated. The control, Formula C, confirmed that the base epoxy formula was stable at both ambient and elevated temperature. It was concluded that changes in the heated samples that contained the curative were a result of the curative used.

EXAMPLE 4

Preparation and Evaluation of a Polysulfide/amino-polyamide composite

This example demonstrates the use of amino-polyamide additives of the instant invention in one-part, curable polysulfide polymer based systems.

The amino-polyamide additives from Examples 1 and 2 were evaluated in two types of liquid polysulfide formulas. In this experiment the additives were used to introduce amine into the system upon activation by heating. A third formula was prepared without any amino-polyamide additive.

Formulas were prepared as shown in Table 4. Two 10 g. samples were taken from each formula and placed into aluminum weighing dishes. The remainder of each formula was stored in a 4 oz. HDPE bottle and sealed under $N_2$. The 10 g. samples were exposed to two environments. One sample of each formula was placed in a 125° C. oven for ten minutes, then left at room temperature while the other was allowed to stand at ambient with no heating of any kind. Observations of the samples cure rates and the stability of the retains in the 4 oz. bottles were made at the following intervals: 10 min., 1 day, and 1 week. The results of these observations can be found in Tables 5 and 6.

In the comparison of the heated samples to those kept at ambient conditions, dramatic acceleration of cure rate was found to take place. The samples which were heated to 125° C. for 10 minutes cured. The samples which were not heated remained fluid.

TABLE 4

ONE-PART CURABLE POLYSULFIDE FORMULAS

| Item | 1 % | 2 % | 3 % |
|---|---|---|---|
| LP3ZC - (liquid polysulfide from Morton) | 73.20 | 73.20 | 91.5 |
| $ZnO_2$ | 6.80 | 6.80 | 8.5 |
| Curative #1 | 20.00 | — | — |
| Curative #2 | — | 20.00 | — |
| Total | 100.00 | 100.00 | 100.00 |

TABLE 5

CURE RATE STUDY: AMBIENT EXPOSED SAMPLES VS. ACTIVATED SAMPLES

| Formula I.D. | Conditioning | Appearance 10 Minutes | 1 Day | 7 Days |
|---|---|---|---|---|
| 1 | Ambient | Fluid | Fluid | Fluid |
| 1 | 10 min. @ 125° C. | Rubbery solid | Rubbery | Rubbery Solid solid |
| 2 | Ambient | Fluid | Fluid | Starting to Cure |
| 2 | 10 min. @ 125° C. | Rubbery | Rubbery | Rubbery Solid |

TABLE 5-continued

CURE RATE STUDY: AMBIENT EXPOSED SAMPLES VS. ACTIVATED SAMPLES

| Formula | | Appearance | | |
|---|---|---|---|---|
| I.D. | Conditioning | 10 Minutes | 1 Day | 7 Days |
| 3 | Ambient | solid Fluid | Fluid | solid Fluid |
| 3 | 10 min. @ 125° C. | Fluid | Fluid | Fluid |

TABLE 6

STABILITY OF POLYSULFIDE FORMULAS STORED AT AMBIENT TEMPERATURE IN SEALED BOTTLES

| | Appearance | | |
|---|---|---|---|
| Formula | 10 Minutes | 1 Day | 7 Days |
| 1 | Fluid | Fluid | Fluid |
| 2 | Fluid | Fluid | Fluid |
| 3 | Fluid | Fluid | Fluid |

Stability testing (Table 6) revealed that both formulas had good stability when stored in sealed bottles.

What is claimed is:

1. A latent activatable composite comprising a base system chosen from the group consisting of epoxies, polysulfides and cyanoacrylates and one or more amine-terminated polyamide curatives dispersed in the base system wherein said composite cures upon activation to form a composition by the reaction of the base system and the polyamide curative or curatives, wherein the polyamide curative is the reaction product of one or more polyamine compounds and one or more polycarboxylic acid compounds, each compound or compounds having a functionality of at least two and and at least one polyamine is selected from the group consisting of 2-methylpentamethylene diamine, hexamethylene diamine, diethylene triamine, piperazine and mixtures thereof and at least one polycarboxylic acid is selected from the group consisting of sebacic acid, azelaic acid, dodecanedioic acid, dimer acid, trimer acid and mixtures thereof.

2. The latent activatable composite of claim 1 wherein the ratio of amine group equivalents to acid group equivalents is from about 1.20:1.00 to about 1.80:1.00 equivalents NHx:COOH wherein x is 1 or 2.

3. The latent activatable composite of claim 1 wherein the base system is a liquid.

4. The latent activatable composite of claim 1 wherein the base system is a powder and the amine-terminated polyamide curative is a solid at room temperature.

5. The latent activatable composite of claim 1 wherein the base system has a melting point at least 5° C. lower than the melting point of the amine-terminated polyamide curative.

6. The latent activatable composite of claim 1 wherein the amine-terminated polyamide curative is encapsulated with an inert encapsulant.

7. The latent activatable composite of claim 1 wherein the amine-terminated polyamide curative is surface treated to minimize the reactivity of the surface of such curative.

8. A composition formed by the latent activatable composite of claim 1.

9. The composition of claim 8 wherein the composition is an adhesive.

10. The composition of claim 8 wherein the application of heat is used to provide activation.

* * * * *